(12) United States Patent
Cote et al.

(10) Patent No.: US 10,474,811 B2
(45) Date of Patent: Nov. 12, 2019

(54) SYSTEMS AND METHODS FOR DETECTING MALICIOUS CODE

(75) Inventors: Matthew Cote, Reston, VA (US); Trevor Tonn, McLean, VA (US)

(73) Assignee: VERISIGN, INC., Reston, VA (US)

( * ) Notice: Subject to any disclaimer, the term of this patent is extended or adjusted under 35 U.S.C. 154(b) by 1511 days.

(21) Appl. No.: 13/436,626

(22) Filed: Mar. 30, 2012

(65) Prior Publication Data

US 2013/0263270 A1   Oct. 3, 2013

(51) Int. Cl.
*G06F 21/52* (2013.01)
*G06F 21/51* (2013.01)

(52) U.S. Cl.
CPC .............. *G06F 21/52* (2013.01); *G06F 21/51* (2013.01); *G06F 2221/2119* (2013.01)

(58) Field of Classification Search
CPC ...................................................... G06F 21/56
USPC ......................................................... 726/24
See application file for complete search history.

(56) References Cited

U.S. PATENT DOCUMENTS

| | | | |
|---|---|---|---|
| 5,644,770 A | 7/1997 | Burke et al. | |
| 6,813,616 B2 | 11/2004 | Simpson et al. | |
| 7,694,150 B1 * | 4/2010 | Kirby | 713/188 |
| 7,809,666 B2 | 10/2010 | Citeau | |
| 7,814,088 B2 | 10/2010 | Simpson et al. | |
| 7,882,561 B2 * | 2/2011 | Costea | G06F 21/564 |
| | | | 713/188 |
| 7,962,961 B1 | 6/2011 | Griffin et al. | |
| 8,161,548 B1 * | 4/2012 | Wan | G06F 21/566 |
| | | | 713/188 |
| 2002/0144233 A1* | 10/2002 | Chong et al. | 717/105 |
| 2005/0022018 A1 | 1/2005 | Szor | |
| 2005/0108554 A1* | 5/2005 | Rubin et al. | 713/187 |
| 2006/0174344 A1* | 8/2006 | Costea | G06F 21/564 |
| | | | 726/24 |
| 2006/0174345 A1 | 8/2006 | Flanagan et al. | |
| 2006/0253458 A1 | 11/2006 | Dixon et al. | |

(Continued)

FOREIGN PATENT DOCUMENTS

| | | |
|---|---|---|
| GB | 2 391 650 A | 2/2004 |
| GB | 2 404 262 A | 1/2005 |

OTHER PUBLICATIONS

Lin et al., "Anti-malicious Injection Based on Meta-programs," Dept. of Computer Science and Engineering, Tatung University, Taiwan, Jan. 10, 2008 (retrieved from http://www.joc.iecs.fcu.edu.tw/Published%20Vol_19_No_1.files/JOC_SE8_2.pdf) (10 pages).

(Continued)

*Primary Examiner* — William S Powers
(74) *Attorney, Agent, or Firm* — Artegis Law Group, LLP

(57) ABSTRACT

A system, method, and computer-readable medium for detecting malicious computer code are provided. Instructions, such as HTML or JavaScript instructions may be received from a server, parsed, and executed. During execution of the instructions, one or more functions of a software application, such as a web browser, may be hooked, and an event object may be created for each called function that is hooked, resulting in a collection of event objects. Rules may be matched with event objects of the collection of event objects to detect malicious code. Attributes from the matched event objects may then be used to locate original malicious script or code injected into a web page.

22 Claims, 9 Drawing Sheets

(56) References Cited

U.S. PATENT DOCUMENTS

| | | | |
|---|---|---|---|
| 2007/0016949 A1 | 1/2007 | Dunagan et al. | |
| 2007/0094725 A1 | 4/2007 | Borders | |
| 2007/0113282 A1* | 5/2007 | Ross | G06F 21/52 |
| | | | 726/22 |
| 2008/0010683 A1* | 1/2008 | Baddour et al. | 726/24 |
| 2008/0320595 A1 | 12/2008 | van der Made | |
| 2009/0070663 A1 | 3/2009 | Fan et al. | |
| 2009/0070873 A1 | 3/2009 | McAfee et al. | |
| 2009/0150999 A1* | 6/2009 | Dewey et al. | 726/24 |
| 2009/0193497 A1 | 7/2009 | Kikuchi et al. | |
| 2010/0024033 A1 | 1/2010 | Kang et al. | |
| 2010/0031353 A1 | 2/2010 | Thomas et al. | |
| 2010/0088769 A1 | 4/2010 | Ferino et al. | |
| 2010/0162398 A1 | 6/2010 | Karecha et al. | |
| 2010/0186088 A1 | 7/2010 | Banerjee et al. | |
| 2010/0251373 A1 | 9/2010 | Gruzman et al. | |
| 2011/0067108 A1 | 3/2011 | Hoglund | |
| 2011/0289582 A1* | 11/2011 | Kejriwal | G06F 21/566 |
| | | | 726/22 |

OTHER PUBLICATIONS

Rathgeber et al., "An Intention-based Malware Attack Prevention System," White Paper, Ikona Software, Inc., Aug. 2009 (retrieved from http://www.ikonasoftware.com.my/ikonak/images/stories/ikonak/pdf/whitepaper.pdf) (9 pages).

Wang et al., "Automated Web Patrol with Strider HoneyMonkeys: Finding Web Sites that Exploit Browser Vulnerabilities," Microsoft Research, 2006 (retrieved from http://citeseerx.ist.psu.edu/viewdoc/summary?doi=10.1.1.100.224) (15 pages).

Websense, "The Websense ThreatSeeker Network: Leveraging Websense HoneyGrid Computing," Websense Inc., 2008 (retrieved from http://www.websense.com/assets/White-PapersWP_HoneyGrid_Computing.pdf) (14 pages).

Sucuri, "Protecting Your Interwebs: About Sucuri Security," Sucuri, 2010 (retrieved from http://sucuri.net/about) (2 pages).

Dasient, "Web Anti-Malware Solution, Malware monitoring, Malware Scanning: Dasient Solution," Dasient, Inc., 2010 (retrieved from http://wam.dasient.com/wam/whydasient_solution) (2 pages).

Barbosa et al, "Using Latent-Structure to Detect Objects on the Web," Proceedings of the $13^{th}$ International Workshop on the Web and Databases, WebDB 2010, ACM SIGMOD 2010, 2010, Indianapolis, IN, (6 pages).

Emir et al., "Matching Objects with Patterns," Lamp-Report-2006-006, Proceedings of European Conference on Object-Oriented Programming—$21^{st}$ European Conference, 2007, Lausanne, Switzerland (25 pages).

Moreau et al., "A Pattern Matching Compiler for Multiple Target Languages," $12^{th}$ Conference on Compiler Constructions, Warsaw Poland, vol. 2622 of LNCS, pp. 61-76, May 2003, http://www.loria.fr/~moreau/Papiers/MoreauRV-CC2003.pdf (16 pages).

Visser, "Matching Objects Without Language Extension," http://wiki.di.uminho.pt/twiki/pub/Personal/Joost/MatchO/MatchingObiects-Draft-Nov2005.pdf, Nov. 2005, (19 pages).

Yara-Project, http://code.google.com/p/yara-project/, Apr. 13, 2011 (3 pages).

Zeng, Ping et al., "Insecure JavaScript Detection and Analysis with Browser-Enforced Embedded Rules," The 11th International Conference on Parallel Distributed Computing, Applications and Technologies: 10.1109/PDCAT.2010.87, pp. 393-398 (2010) (6 pages).

Australian Patent Examination Report dated Dec. 12, 2014, Australian Patent Application No. 2013201003, pp. 1-5.

Extended European Search Report for Application No. 13161826.6 dated Jan. 31, 2017.

* cited by examiner

700

SYSTEMS AND METHODS FOR DETECTING MALICIOUS CODE

RELATED APPLICATIONS

This application is related to U.S. patent application Ser. No. 13/166,256, filed Jun. 22, 2011, entitled "SYSTEMS AND METHODS FOR INTER-OBJECT PATTERN MATCHING," to U.S. patent application Ser. No. 12/982,508, filed Dec. 30, 2010, entitled "SYSTEMS AND METHODS FOR MALWARE DETECTION AND SCANNING," and to U.S. patent application Ser. No. 12,982,540, filed Dec. 30, 2010, also entitled "SYSTEMS AND METHODS FOR MALWARE DETECTION AND SCANNING," the entire contents of each of which are incorporated herein by reference in their entireties.

TECHNICAL FIELD

The present disclosure relates to detecting malicious computer code, and more particularly, to systems and methods for using patterns to detect malicious code.

BACKGROUND OF THE DISCLOSURE

The growth of computer networking has brought with it an explosion in the number of malicious software attacks, commonly referred to as malware attacks. Malware, short for malicious software, is software that is designed for hostile or intrusive purposes. For example, malware may be designed with the intent of gathering information, denying or disrupting operations, accessing resources without authorization, or other abusive purposes. Types of malware attacks may include viruses, worms, trojan horses, spyware, adware, botnets, rootkits, and denial of service attacks (DDOS). Malware developers typically distribute their software via the Internet, often clandestinely. As Internet use continues to grow around the world, malware developers have more incentives than ever for releasing this software.

Malware is often installed on computers running browsers while communicating with malicious web pages that exploit browser vulnerabilities. These malicious web pages may use an "exploit" or "exploit kit" to download and run an executable program of an attacker's choosing on a visitor's computer without any interaction from the user. That is, flaws in either the browser or automatically launched external programs and extensions can allow a malicious web page to install malware automatically when a user visits the malicious web page, such that the user may not be aware of the installation.

Often the web page accessed by a user is an "innocent" web page that has been compromised to reference a malicious web page. Attackers compromise the "innocent" web page in order to drive traffic to their malicious web page, which is used for hosting malicious code, such as malicious executables or browser exploit code. Attackers find ways to inject Hypertext Markup Language (HTML) code into an innocent web page, which causes the visitor's browser to request and process content from the malicious web page without the visitor's knowledge. For example, injected HTML may be an iframe or script HTML element, which are elements that do not require user interaction with the "innocent" web page to download malicious content. Attackers can use search engines to find web pages that are vulnerable. This often leads to mass injection campaigns where a large number of vulnerable web pages are injected with code to reference a few malicious web pages.

When a browser accesses a web page, a web server sends HTML data to the browser. The browser parses the HTML data and builds a Document Object Model (DOM) tree. The browser then requests additional resources referenced in the HTML, such as JavaScript files. Element nodes of the DOM are accessible from JavaScript. JavaScript is usually used to write functions that are embedded in the HTML of a web page and that interact with the DOM of the web page. When the JavaScript is parsed and executed, the nodes of the DOM can be changed based on the execution. The browser then renders the web page based on the DOM tree and information for each node of the DOM tree. In addition to the elements of the DOM, the browser provides other objects that represent various features of the browser, each of which have their own methods that can be called. The browser also has its own compiled code that implements any function or method called on DOM elements or JavaScript objects.

As an example, assume that a programmer has written JavaScript code to create a new div element in HTML using a method of the document object of HTML. Assume that the programmer has also written JavaScript code to append this new element to the body element of the DOM using the document.body.appendChild method. When this code is executed, the new div element will be appended to the body element of the DOM. Similarly, an attacker can write JavaScript code that, if successfully injected into the HTML of a web page, can cause an element, such as an iframe, to be appended to the body element of the HTML. This iframe could contain height and width values of zero, and reference a malicious web page. As a result, a user's browser accessing a web page with the injected code would also access a malicious web page, without the malicious web page being displayed. Malicious exploit code could then be downloaded to the user's computer, without any interaction from the user other than accessing the web page with the injected code.

Often multiple malware exploits or tasks are implemented in tandem, causing a computer to download, store, and then execute a malware executable, also referred to as a binary module. In many cases, a successful exploit results in the automatic installation of a malware binary module, often called a "drive-by download." The installed malware may enable a malware attacker to gain remote control over the compromised computer system and, in some cases, enable a malware attacker to steal sensitive information, send out spam, or install more malicious executable modules over time.

Malware propagation wastes valuable resources, such as system user time, system administrator resources, network bandwidth, disk space, and central processing unit (CPU) cycles. Malware can also corrupt data files such that the originals may not be recoverable. Additionally, malware can cause the compromised computer to transmit confidential data (e.g., banking information, passwords, etc.) to the malware attacker.

Previous attempts to identify these types of malicious code have focused on matching certain expressions or strings in the code. Attackers are aware of these attempts and have taken further steps to hide their code from this type of matching. For example, attackers often obfuscate the injected code, so that it is unreadable by humans without analysis, and so that it is impossible to match with simple expression or string matching. Attackers also spread scripts out over multiple files that are requested by the browser, and then concatenate the pieces together in execution of the code.

Accordingly, an improved approach to identifying malicious code is needed. The disclosed embodiments address one or more of the problems set forth above.

SUMMARY OF THE DISCLOSURE

Consistent with the present disclosure, there is provided a computer-implemented method for detecting malicious software code, comprising launching, in a computing device of a computer system, a software application comprising a plurality of primary functions; and receiving instructions from a server. The method also comprises performing a function call of one of the primary functions, based on the instructions; intercepting the primary function call; calling and executing a secondary function to create a first event object, the first event object including one or more attributes related to the primary function call; and storing the first event object in a collection of event objects of a data structure, the event objects of the collection including attributes related to primary function calls. The method further comprises determining whether a rule is satisfied based on an application of one or more conditions of the rule to one or more of the event objects of the collection.

Also consistent with the present disclosure, there is provided a computer system for detecting malicious software code, the computer system comprising a memory storing program code and a processor executing the program code to launch a software application comprising a plurality of functions. The processor also executes the program code to receive instructions from a server; perform a function call of one of the plurality of functions, based on the instructions; intercept the primary function call; and call and execute a secondary function to create a first event object, the first event object including one or more attributes related to the primary function call. The processor further executes the program code to store the first event object in a collection of event objects of a data structure, the event objects of the collection including attributes related to the primary function calls; and determine whether a rule is satisfied based on an application of one or more conditions of the rule to one or more of the event objects of the collection.

Further consistent with the present disclosure, there is provided a non-transitory computer-readable storage medium containing program code that, when executed by a processor, causes the processor to perform a method. The method comprises launching a software application comprising a plurality of primary functions; and receiving instructions from a server. The method also comprises performing a function call of one of the primary functions, based on the instructions; intercepting the primary function call; calling and executing a secondary function to create a first event object, the first event object including one or more attributes related to the primary function call; and storing the first event object in a collection of event objects of a data structure, the event objects of the collection including attributes related to primary function calls. The method further comprises determining whether a rule is satisfied based on an application of one or more conditions of the rule to one or more of the event objects of the collection.

Before explaining at least one embodiment of the disclosure in detail, it is to be understood that the disclosure is not limited in its application to the details of construction and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

DETAILED DESCRIPTION

Reference will now be made in detail to the present embodiments of the disclosure, certain examples of which are illustrated in the accompanying drawings.

Figure 1:
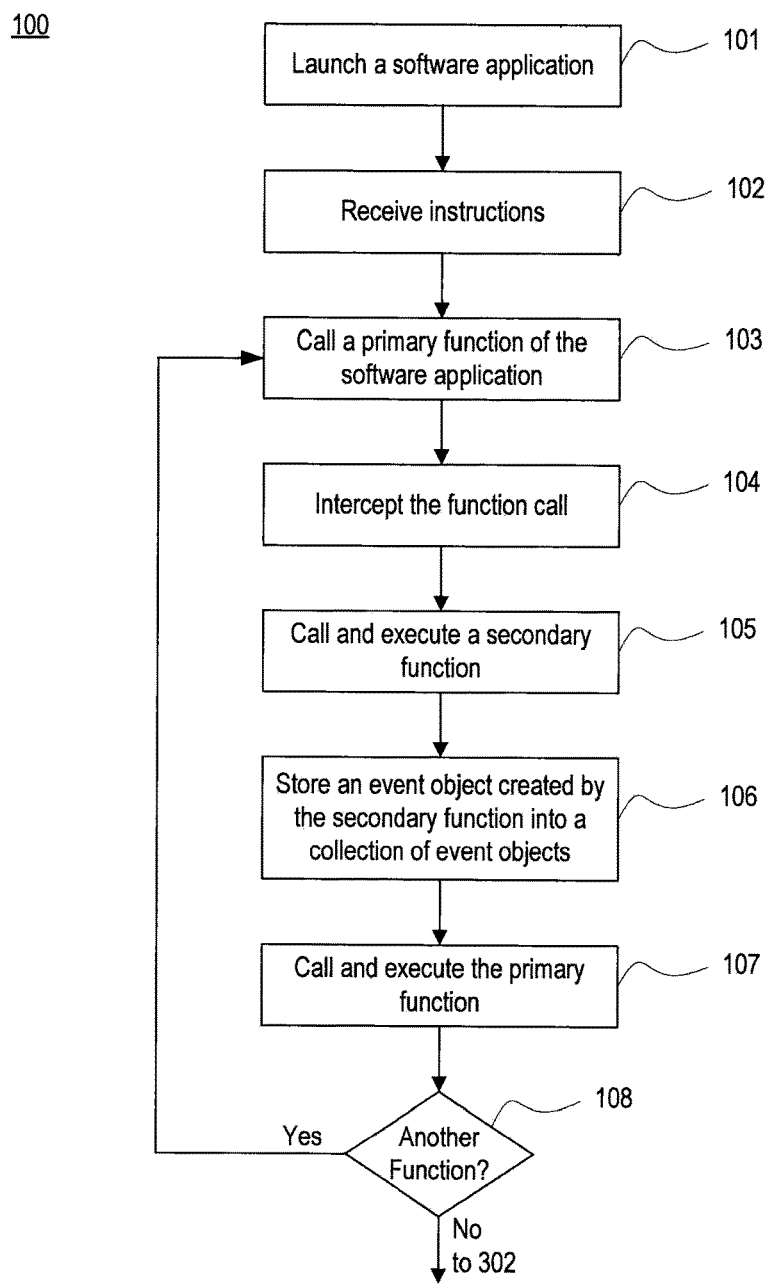
FIG. 1 illustrates an exemplary method for hooking functions of a software application and for creating event objects associated with the functions.

FIG. 1 illustrates a flow diagram of an exemplary method 100 for carrying out embodiments disclosed herein. In step 101, a software application may be launched. The software application may be a web browser application, such as, Microsoft Internet Explorer™, Mozilla Firefox™, Apple Safari™, Google Chrome™, Opera™, Netscape Navigator™, etc. Alternatively, the software application may be an application that emulates a web browser. Both web browser applications and web browser emulator applications will be referred to as "web browser" or "browser" below. The software application may also include one or more external programs or extensions that are loaded by a web browser, such as plug-ins and add-ons. Plug-ins or add-ins may include, for example, a Portable Document File (PDF) reader or ActiveX controls such as Microsoft Access Data Components (MDAC). The software application may be a particular version of the application and may contain a particular combination of external programs or extensions.

In step 102, instructions may be received from a server, such as a web server. The instructions may include instructions in one or a combination of formats, including HTML, eXtensible Hypertext Markup Language (XHTML), Javascript, Adobe Flash™, Portable Document File (PDF), Java, etc. The instructions may be received in response to a request for a web page. The instructions may then be parsed and formatted for execution or rendering by the software application. While recognizing that the disclosure encompasses the above-described instruction formats, for ease of explanation the description below will be limited to the context of receiving HTML and JavaScript instructions.

After receiving HTML instructions, the browser may build a DOM tree with nodes representing a variety of features of the HTML instructions, such as the elements, attributes, text, etc. If the HTML includes reference to a JavaScript file, a request for the JavaScript file may be made and the JavaScript file may be received. The software application may then parse and begin to execute the JavaScript.

The browser may keep an internal data structure of the DOM tree, and may have functions that will be called when making changes to the DOM tree. In step 103, instructions may be executed that cause a primary function of the browser to be called. In step 104, the browser may intercept the call to the primary function, so that the primary function is not executed. Instead, program flow may be redirected to a secondary function. For example, a programmer may insert code in front of a primary function in a software application and the code may redirect program flow to a secondary function. This may be referred to as "hooking" a function. The inserted code may also cause a reference to the location where the inserted code ends and the primary function begins to be stored, so that program flow may return to the primary function later.

In step 105, the secondary function may be called and executed. Execution of the secondary function may result in the creation of an event object. The event object may include one or more attributes related to the call to the primary function. In step 106, the event object may be stored into a collection of event objects in a data structure. In step 107, the primary function may be called and executed. This may be accomplished, for example, by calling the primary function at the stored reference location. In step 108, after execution of the primary function, it may be determined whether there is an additional primary function to be called. If it is determined that an additional primary function is to be executed, then steps 103-107 may be repeated by calling the additional primary function in step 103. This may be continued until there are no more primary functions to be called, at which point the method may proceed to step 302. The point at which there are no more primary functions to be called may occur when the browser has finished rendering the web page.

Figure 2A:
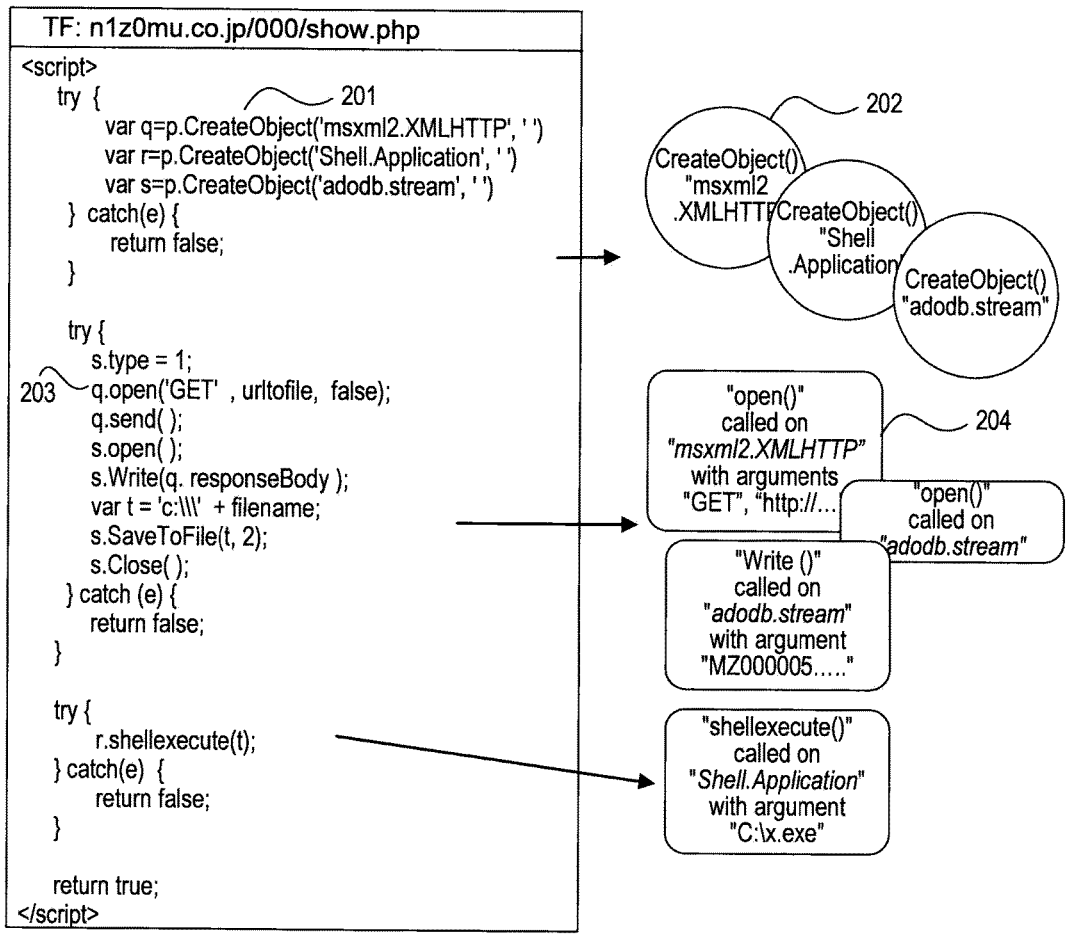
FIG. 2A illustrates an exemplary piece of JavaScript code and exemplary event objects created from execution of the JavaScript code.

By performing method 100, event objects may be obtained and stored for primary function calls throughout execution of the instructions. The result is a collection of event objects. FIG. 2A illustrates an exemplary piece of JavaScript instructions and event objects that are created during execution of the JavaScript instructions. For example, executing the instructions at 201 may result in a primary function of the browser being called. By hooking this primary function, an event object 202 may be created. Similarly, executing the instructions at 203 may result in a primary function of the browser being called. By hooking this primary function, an event object 204 may be created.

The event objects may include one or more attributes related to the primary function call that was hooked to create it. For example, event object 202 includes attributes describing the method name CreateObject( ) and the arguments string "msxml2.XMLHTTP." Event object 204 includes attributes describing the method name open( ) an object type "msxml2.XMLHTTP," and arguments "GET," "http:// . . . ."

Figure 2B:
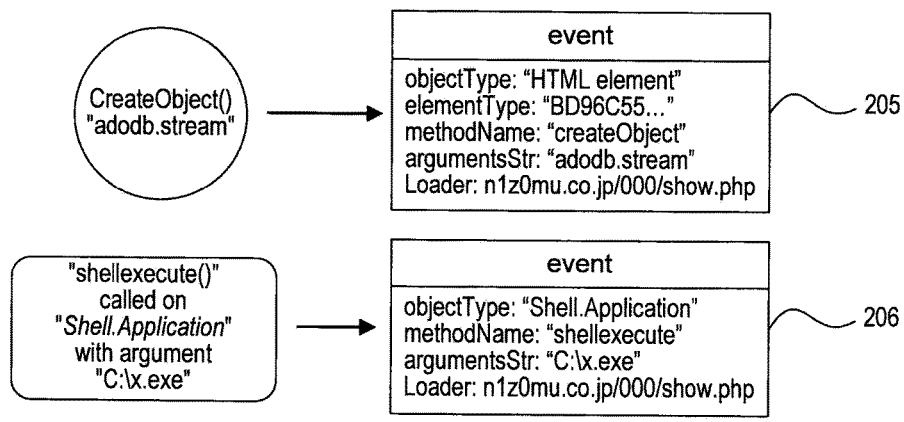
FIG. 2B illustrates exemplary event objects including attributes related to a function call.

The attributes that are stored for event objects may vary depending on the event the event object represents. This is further illustrated in FIG. 2B. Event object 205 may represent a CreateObject event and may include attributes for object type, element type, method name, arguments string, and loader. Event object 206 may represent a shellexecute event and may include attributes for object type, method name, arguments string, and loader. However, in contrast to event object 205, event object 206 may not include an attribute for element type.

Figure 2C:
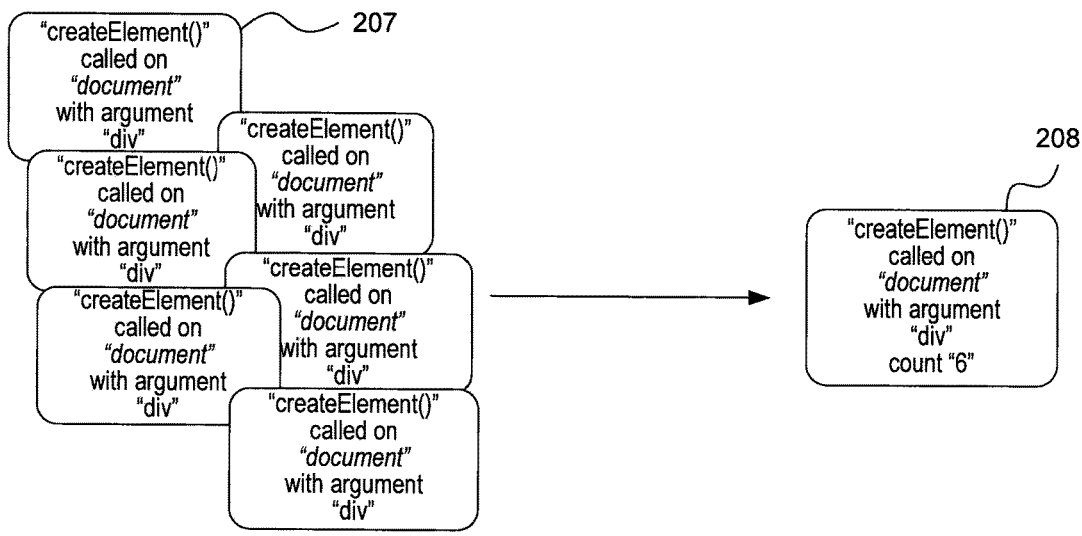
FIG. 2C illustrates an exemplary grouping of event objects into a meta-event object.

Once there are no more primary functions to call, similar event objects from the collection of event objects may be selected and grouped into one or more meta-event objects. By combining similar event objects into meta-event objects, additional attributes relating to the primary functions called during execution of the instructions may be derived. This is further illustrated in FIG. 2C. In the example of FIG. 2C, six event objects 207 have been created. Each of the event objects 207 includes attributes describing a method name createElement( ) an object type document, and an arguments string div. These similar event objects may be grouped into a meta-event object 208 including attributes describing a method name createElement( ) an object type document, and an arguments string div. The meta-event object 208 may further include an attribute storing a count of 6, which indicates that the createElement( )method was called on document with argument div six times.

Figure 2D:
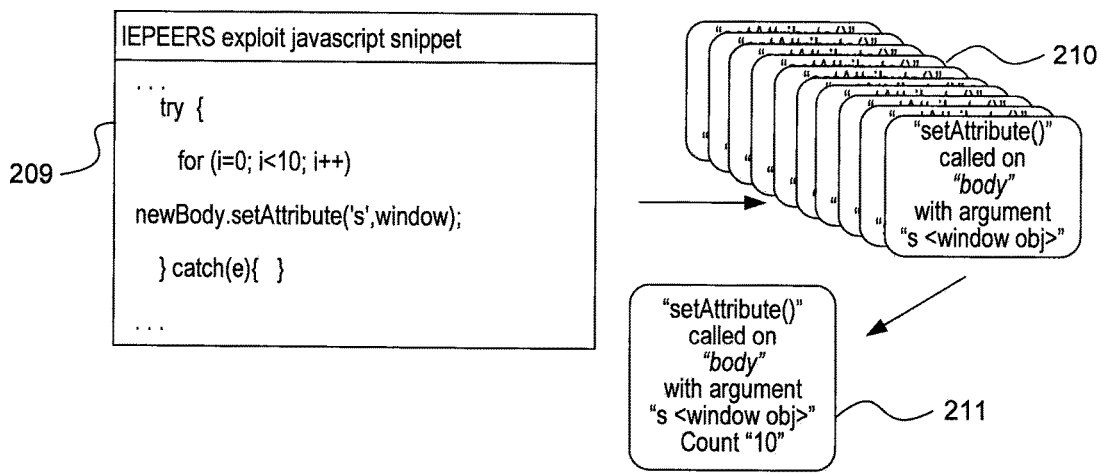
FIG. 2D illustrates an exemplary piece of JavaScript code, exemplary event objects created from execution of the code, and an exemplary meta-event object created from grouping the event objects.

FIG. 2D illustrates an exemplary piece of JavaScript instructions 209, event objects 210 that may be created during execution of the JavaScript instructions, and a meta-event object 211 that may be created by grouping the event objects 210. JavaScript instructions 209 indicate a for( ) loop that repeats and calls the setAttribute( ) method on object type body with arguments string "s" and a reference to the DOM's Window object ten times. For each of the ten times the for( ) loop repeats, the instructions within the for( ) loop may result in a function of the browser being called. By hooking this function, an event object 210 may be created. However, since the for( ) loop repeats ten times, ten event objects 210 may be created. These similar event objects may be grouped into a meta-event object 211 including attributes to describe that a method name setAttribute( ) was called on an object type body with arguments string "s" and referencing the DOM's Window object ten times.

Figure 3:
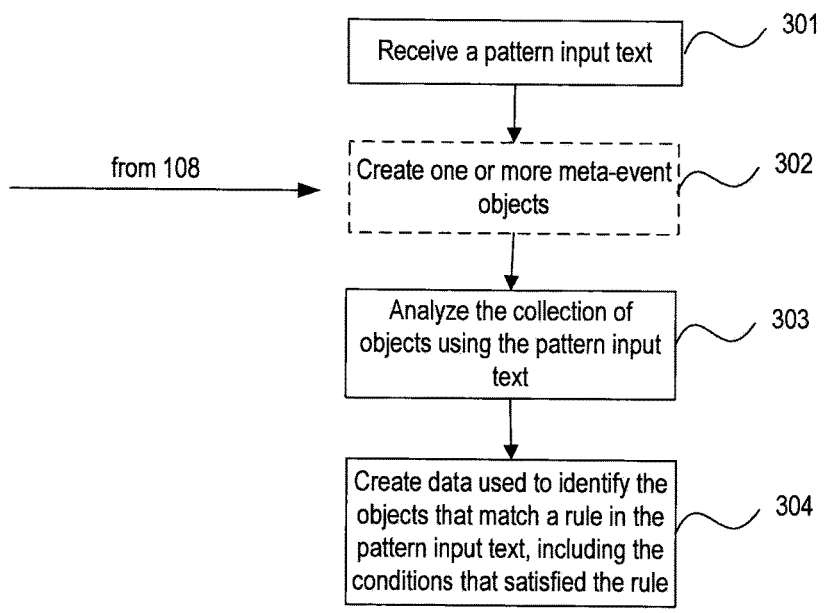
FIG. 3 illustrates an exemplary method of determining whether a rule is satisfied based on an application of conditions of the rule to event objects.

Once there are no more primary functions to be called, method 100 may proceed as indicated in method 300 of FIG. 3. In step 301, a pattern input text may be received. The pattern input text may describe rules associated with a pattern by which to identify malicious scripts or code, conditions associated with each rule, and a match statement that indicates which conditions must be met for a particular rule to be satisfied. The conditions may include one or more sub-conditions. A sub-condition may comprise an attribute and a value.

The pattern text may be input by a user, or may be retrieved from a location where the pattern input text is stored. In some embodiments, the pattern input text may be a string. In other embodiments, the pattern input text may be a file, a database table, or other document. A user may create the pattern input text. Alternatively, the pattern input text may be iteratively developed over time based on an analysis of patterns that one or more computers identify as being associated with malicious software. Such an analysis may be, for example, a neural network type analysis.

Figure 4:
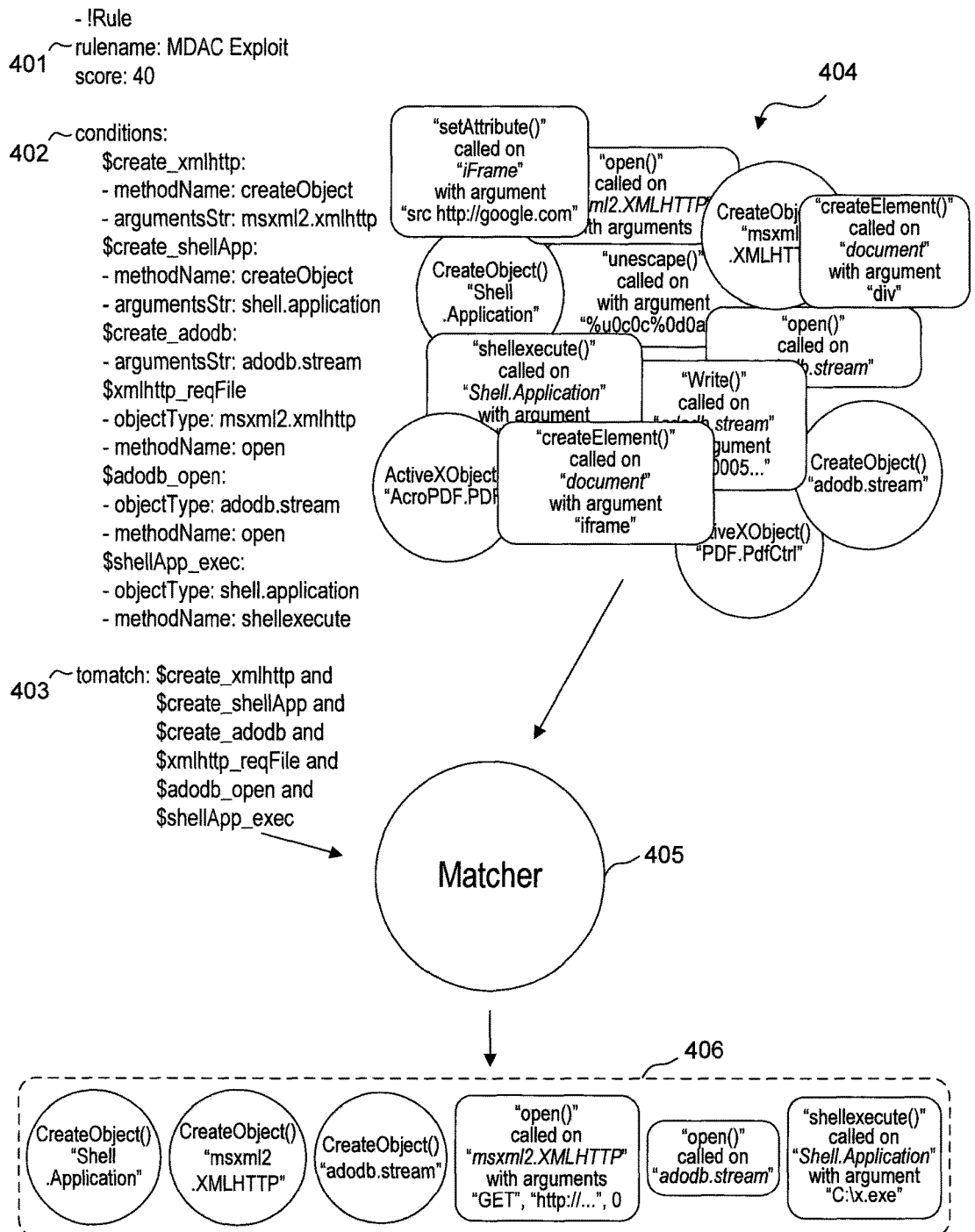
FIG. 4 illustrates an exemplary matching between an exemplary rule and an exemplary collection of event objects.

FIG. 4 illustrates an exemplary rule of pattern input text. The rule may specify one or more exploits 401 that the rule intends to identify. The rule may further specify one or more conditions 402 that must be satisfied in order for a match to be identified. For example, rule 401 specifies $create_xmlhttp, $create_shellApp, $create_adodb, $xmlhttp_reqFile, $adodb_open, and $shellApp_exec as conditions 402 that must be satisfied in order for a match to be identified. The conditions may have sub-conditions that must be satisfied in order for the condition to be satisfied. For example, sub-conditions of an attribute methodName with value createObject and of an attribute argumentsStr with a value of msxml2.xmlhttp must be satisfied in order for the condition $create_xmlhttp to be satisfied. A matching rule may indicate the conditions that must be satisfied in order for a match to be identified. For example, matching rule 403 indicates that each of the conditions 402 must be satisfied in order for a match to be identified.

Further details of the pattern matcher 405 can be found in co-pending, related U.S. patent application Ser. No. 13/166,256, filed Jun. 22, 2011, entitled "SYSTEMS AND METHODS FOR INTER-OBJECT PATTERN MATCHING," the entire contents of which is incorporated herein by reference in its entirety.

Returning to FIG. 3, after a collection of event objects have been received from step 108, one or more meta-event objects may be created in step 302. Step 302 may be an optional step that may be performed if similarities are found between one or more event objects of the collection. The one or more meta-events may be created as previously discussed with respect to FIG. 2C and FIG. 2D. Whether meta-events are created or not, the collection of event objects received in step 108 may be analyzed using the pattern input text in step 303. This is further illustrated in FIG. 4. Rule 401 represents a rule of pattern input text, the rule containing conditions 402 and a matching rule 403 indicating that all of the conditions must be met in order for a match to be identified. Event objects 404 represent a collection of event objects. Matcher 405 represents step 303 of FIG. 3, where the collection of event objects is analyzed using the pattern input text.

After the event objects in the collection of event objects are analyzed in step 303, data may be created in step 304 in order to identify the event objects that match a rule in the pattern input text. This data may include the conditions that satisfied the rule of the pattern input text. This is further illustrated in FIG. 4. In the example of FIG. 4, a matcher 405 matches event objects 404 of a collection of event objects with conditions 402 of a matching rule 403. Data 406 identifying the event objects that satisfy the conditions of rule 401 is then output. Data 406 may then be used for various purposes, such as identifying malicious scripts or software code, improving the rules of the pattern input text, commercialization for sale to anti-malware service providers, etc.

Figure 5:
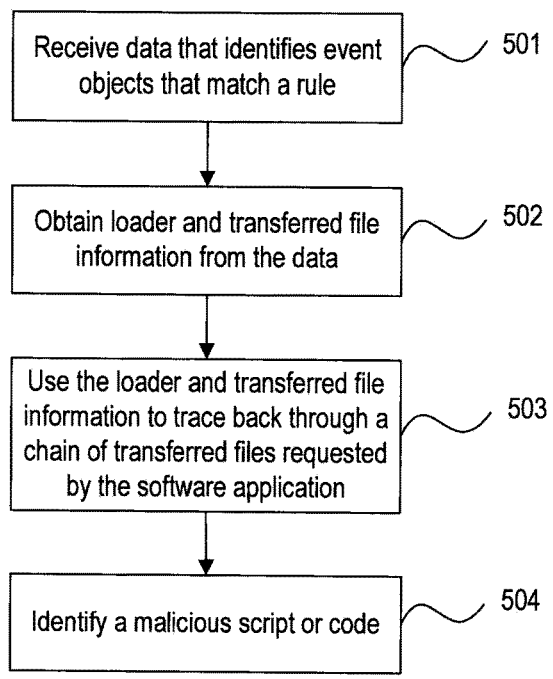
FIG. 5 illustrates an exemplary method for tracing through a chain of transferred file instances to identify a malicious script or code.

FIG. 5 illustrates a flowchart of an exemplary method 500 for identifying a malicious script or malicious code. In step 501, the method may receive data created in step 304. The data from one or more of the matched event objects may include a loader object address, as was previously illustrated in FIG. 2B. In one embodiment, event objects may have associated loader objects. In step 502, the method may use the loader object address to retrieve the loader object.

Figure 6A:
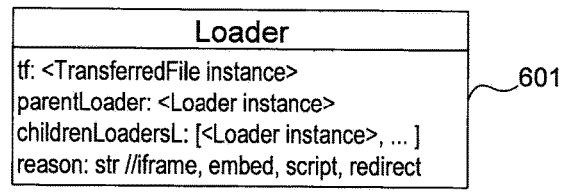
FIG. 6A illustrates an exemplary loader object and attributes associated with the exemplary loader object.

FIG. 6A shows an example of a loader object 601. A loader object 601 may include a reference to the original transferred file instance, such as the actual script, html, image, executable, etc., that contained the code that caused an event object to be created. As further illustrated in FIG. 6A, a loader object 601 may contain further information, such as references to parent and child loader objects and a reason for loading the code.

Figure 6B:
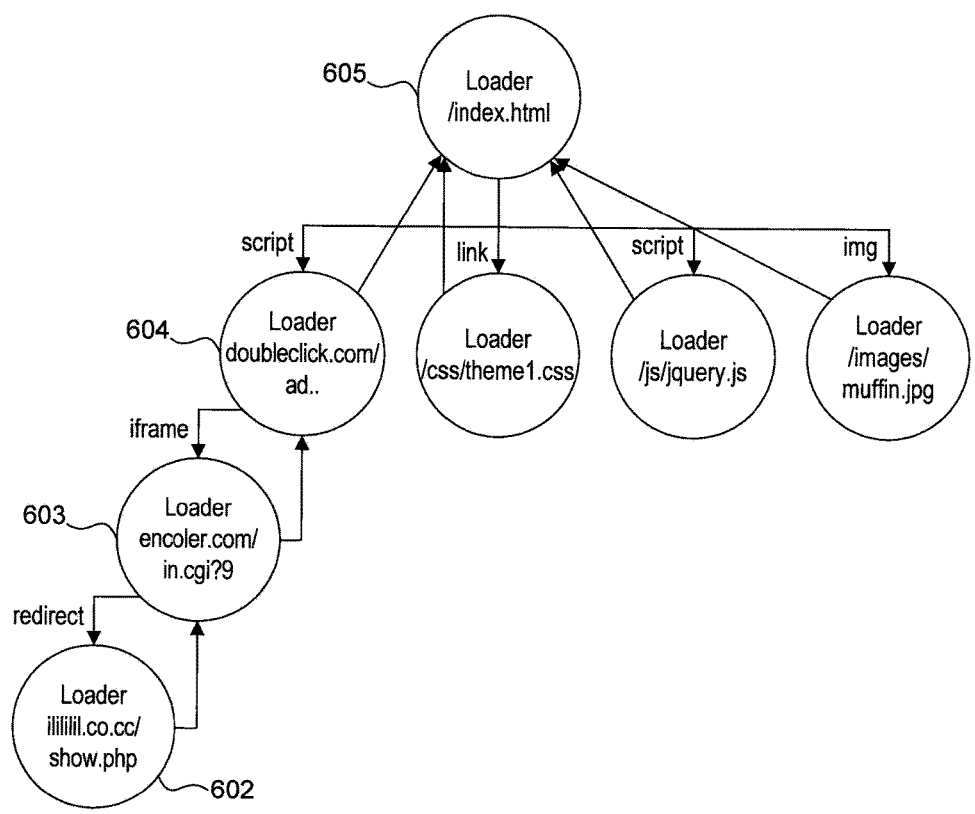
FIG. 6B illustrates an exemplary diagram of tracing through a chain of transferred file instances to identify a malicious script or code.

Returning to FIG. 5, in step 503, method 500 may use the loader object information to trace back through a chain of transferred files requested by the software application. After tracing back to the source, method 500 may identify the malicious scripts or code in step 504. FIG. 6B illustrates an example of the tracing back of method 500.

In FIG. 6B, loader object 602 indicates that the transferred file was ililiil.co.cc/show.php. Loader object 602 may also include a reference to a parent loader object 603. Loader object 602 may further store information indicating that the transferred file was loaded as a result of a redirect. Loader object 603 indicates that the transferred file was encoler.com/in.cgi?9. Loader object 603 may also include a reference to a parent loader object 604, and a reference to child loader object 602. Loader object 603 may also store information indicating that the transferred file was loaded as a result of an iframe. Loader object 604 indicates that the transferred file was doubleclick.com/ad . . . . Loader object 604 may also include a reference to parent loader object 605, and a reference to child loader object 603. Loader object 604 may also store information indicating that the transferred file was loaded as a result of a script. Loader object 605 indicates that the transferred file was /index.html. Loaded object 605 may also include a reference to child loader object 604.

Method 500 may trace the loader objects back to the source. For example, in FIG. 6B, method 500 may trace back through loader objects 602-604 to reach the source loader object 605. This indicates that the server serving index.html has a <script> tag referencing doubleclick.com/ad . . . , and that this <script> tag is causing malicious code to be downloaded to computers of users visiting the web page served by the server. This data may be used to inform the owner of the server serving index.html that he must remove the <script> tag that references doubleclick.com.

Figure 7:
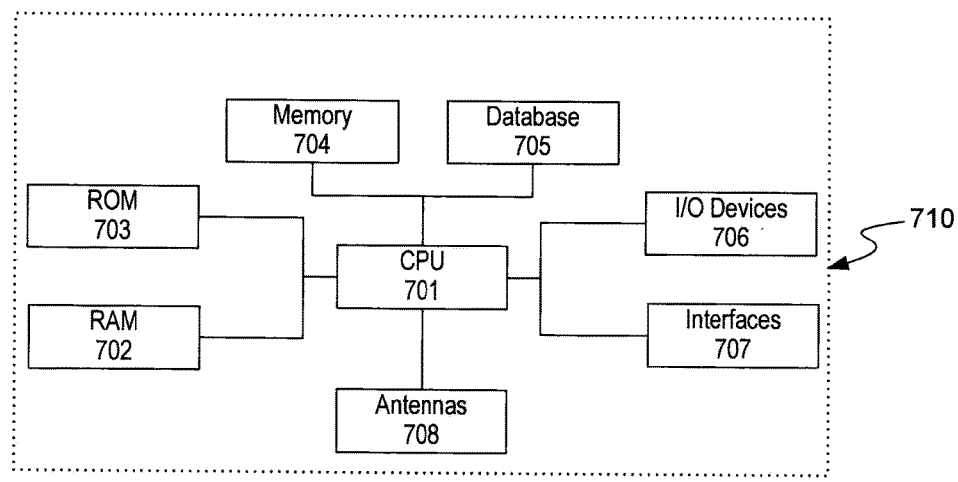
FIG. 7 illustrates an exemplary computer system for implementing the disclosed embodiments.

FIG. 7 is a diagram illustrating an exemplary computer system 700 that may be used for implementing the disclosed embodiments. Computer system 700 may include one or more computers 710, which may be servers, personal computers, and/or other types of computing devices. Computer 710 may include one or more of the following components: a central processing unit (CPU) 701 configured to execute computer program code to perform various processes and methods, including the embodiments herein described; random access memory (RAM) 702 and read only memory (ROM) 703 configured to access and store information and computer program code; memory 704 to store data and information; database 705 to store tables, lists, or other data structures; I/O devices 706; interfaces 707; antennas 708; etc. Each of these components is well-known in the art and will not be discussed further.

Figure 8:
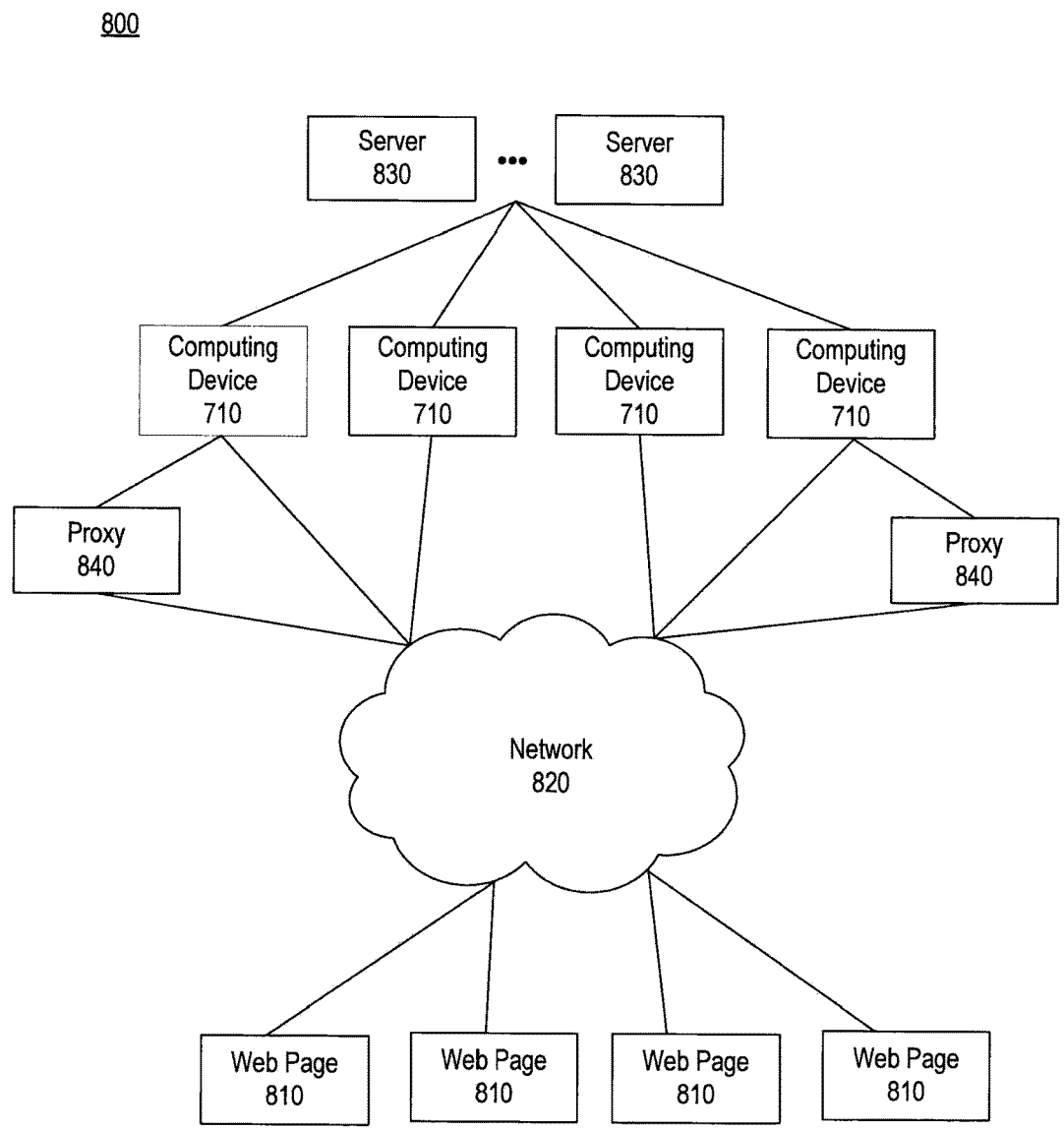
FIG. 8 illustrates an exemplary system for implementing the disclosed embodiments.

FIG. 8 is a block diagram of an exemplary hub-and-spoke computing system 800 in which systems and methods consistent with the present disclosure may be implemented.

Specifically, FIG. 8 illustrates an example scalable hub-and-spoke computing system 800 that allows distributed processing across multiple computing devices. In FIG. 8, scalable hub-and-spoke computing system 800 includes one or more computing devices 710, one or more web pages 810, network 820, one or more servers 830, and one or more proxies 840.

As used in FIG. 8, computing device 710 may also be referred to as a "thick spoke," and may be configured to be an autonomous computing device operable to perform honeypot, analysis, and "crawl" functions. Also, as used in FIG. 8, proxy 840 may be referred to as a "thin spoke," and may be a computing device functioning as the proxy of a thick spoke to aid in IP diversification. Generally, IP diversification may be achieved through the use of a diverse range of IP addresses to perform web crawling. Servers 830 may be any type of computing device, many of which are known in the art. Servers 830 may be configured to receive malware scan requests, and send the malware scan requests to one or more computing devices 710 for further processing. Servers 830 may also be configured to analyze data to autonomously identify malware scan requests, and send the malware requests to one or more computing devices 710 for further processing. Malware scan requests may include one or more parameters, such as, for example, target uniform resource identifiers (URIs), uniform resource locators (URLs), and/or uniform resource names (URNs). The malware scan requests may also include configuration information for the web browsers, such as the type and version number of web browsers to use, which type and version number of external programs and extensions to load, and how many and which web browsers should be implemented on each of computing devices 710. The one or more target URIs, URLs, and/or URNs may, for example, be used to identify web pages 810 upon which malware scanning is to be performed by computing system 800. Although servers 830 are illustrated in FIG. 8 as connected to only four computing devices 710, servers 830 may be connected to and/or in communication with any number of computing devices 710 such that the number of computing devices 710 may be scalable in both an increasing and decreasing manner. Likewise, servers 830 may include any number of servers, such that the number of servers 830 may be scalable in both an increasing and decreasing manner.

Proxies 840 may be any computing device configured to serve as an Internet proxy. In the embodiment illustrated by FIG. 8, computing devices 710 may be configured to use one or more proxies 840 to make traffic appear to originate from a different source based on an IP address associated with proxy 840. In some embodiments, computing devices 710 and proxies 840 may be within the same netblock ("/24") of IP addresses (i.e., the last eight bits). In other embodiments, computing devices 710 and proxies 840 may be in different netblocks of IP addresses. In some embodiments, computing devices 710 and proxies 840 may be geographically separated.

Each computing device 710 may perform methods 100, 300, and 500. Alternatively, one or more of methods 100, 300, and 500 may be performed by one or more servers 830. For example, method 100 may be performed by computing device 710, and the event objects may be transmitted to server 830. Server 830 may then perform method 300. The same or a different server may then perform method 500.

After a computing device 710 requests a web page and receives instructions from a server, the computing device may store the instructions for analysis by one or more of methods 100, 300, and 500. As a result, computing devices may perform one or more of methods 100, 300, and 500 in an online or offline state.

Further details of the hub-and-spoke computing system 800 can be found in co-pending, related U.S. patent application Ser. No. 12/982,508, filed Dec. 30, 2010, entitled "SYSTEMS AND METHODS FOR MALWARE DETECTION AND SCANNING," and in co-pending, related U.S. patent application Ser. No. 12/982,540, filed Dec. 30, 2010, also entitled "SYSTEMS AND METHODS FOR MALWARE DETECTION AND SCANNING," the entire contents of each of which are incorporated herein by reference in their entireties.

The many features and advantages of the disclosure are apparent from the detailed specification, and thus, it is intended that the appended claims cover all systems and methods which fall within the true spirit and scope of the disclosure. As used herein, the indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

The invention claimed is:

1. A computer-implemented method for detecting malicious software code, comprising:
   launching, in a computing device of a computer system, a software application comprising a plurality of primary functions for modifying an internal data structure associated with the software application;
   receiving instructions from a server;
   during execution of at least one instruction in the instructions,
      performing a function call of a first primary function of the plurality of primary functions specified in the at least one instruction,
      intercepting the function call prior to the internal data structure being modified by an execution of the first primary function,
      in response to the function call being intercepted, calling and executing a secondary function to create a first event object, the first event object including one or more attributes related to the function call, and
      storing the first event object in a collection of event objects associated with the instructions, wherein each event object stored in the collection of event objects is created by a separate execution of the secondary function and in response to a separate function call of at least one primary function included in the plurality of primary functions;
   determining that a rule is satisfied based on applying one or more conditions of the rule to the collection of event objects; and
   identifying, based on the determination that the rule is satisfied, the instructions as malicious software code.

2. The method of claim 1, further comprising identifying a subset of event objects included in the collection of event objects based on each event object in the subset of event objects including a corresponding attribute having a similar attribute value, and generating a first meta-event object that includes the subset of event objects.

3. The method of claim 2, further comprising deriving one or more additional attributes related to the first meta-event object based on the subset of event objects included in the first meta-event object.

4. The method of claim 2, wherein identifying the subset of event objects comprises determining that each event object in the subset of event objects includes a first attribute value that specifies a same method name associated with the first primary function and a second attribute value that specifies a same argument string.

5. The method of claim 4, further comprising deriving one or more additional attributes related to the first primary function that identifies a total number of event objects included in the subset of event objects.

6. The method of claim 4, further comprising deriving one or more additional attributes related to the first primary function from the subset of event objects that that identifies a total number of times the first primary function was called by at least one instruction in the instructions.

7. The method of claim 1, wherein the one or more attributes of the first event object includes at least one of an object type, an element type, an arguments string, or a loader object address.

8. The method of claim 1, wherein the instructions comprise HyperText Markup Language (HTML) instructions.

9. The method of claim 1, wherein the instructions comprise JavaScript instructions.

10. The method of claim 1, wherein the software application is one of a web browser or a web browser emulator.

11. The method of claim 1, further comprising tracing back, if the rule is satisfied, through a chain of transferred file instances to identify an original filename of one of a script or code on a web server, using a loader object address included in the first event object.

12. A system for detecting malicious software code, the system comprising:
a memory storing program code; and
a processor executing the program code to:
launch, in a computing device of a computer system, a software application comprising a plurality of primary functions for modifying an internal data structure associated with the software application;
receive instructions from a server;
during execution of at least one instruction in the instructions,
perform a function call of a first primary function of the plurality of primary functions specified in the at least one instruction,
intercept the function call prior to the internal data structure being modified by an execution of the first primary function,
in response to the function call being intercepted, call and execute a secondary function to create a first event object, the first event object including one or more attributes related to the function call, and
store the first event object in a collection of event objects associated with the instructions, wherein each event objects stored in the collection of event objects is created by a separate execution of the secondary function and in response to a separate function call of at least one primary function included in the plurality of primary functions;
determine that a rule is satisfied based on applying one or more conditions of the rule to the collection of event objects; and
identify, based on the determination that the rule is satisfied, the software application as malicious software code.

13. The system of claim 12, further comprising identifying a subset of event objects included in the collection of event objects based on each event object in the subset of event objects including a corresponding attribute having a similar attribute value, and generating a first meta-event object that includes the subset of event objects.

14. The system of claim 13, wherein the processor further executes the program code to derive one or more additional attributes related to the first meta-event object based on the subset of event objects included in the first meta-event object.

15. The system of claim 12, wherein the one or more attributes of the first event object includes at least one of an object type, an element type, an arguments string, or a loader object address.

16. The system of claim 12, wherein the instructions comprise HyperText Markup Language (HTML) instructions.

17. The system of claim 12, wherein the instructions comprise JavaScript instructions.

18. The system of claim 12, wherein the software application is a web browser or web browser emulator.

19. The system of claim 12, wherein the processor further executes the program code to trace back, if the rule is satisfied, through a chain of transferred file instances to identify an original filename of one of a script or code on a server, using a loader object address included in the first event object.

20. One or more non-transitory computer-readable storage media containing program code that, when executed by one or more processors, cause the one or more processors to perform a method comprising:
launching, in a computing device of a computer system, a software application comprising a plurality of primary functions for modifying an internal data structure associated with the software application;
receiving instructions from a server;
during execution of at least one instruction in the instructions,
performing a function call of a first primary function of the plurality of primary functions specified in the at least one instruction,
intercepting the function call prior to the internal data structure being modified by an execution of the first primary function,
in response to the function call being intercepted, calling and executing a secondary function to create a first event object, the first event object including one or more attributes related to the function call, and
storing the first event object in a collection of event objects associated with the instructions, wherein each of the event objects stored in the collection of event objects is created by a separate execution of the secondary function and in response to a separate function call of at least one primary function included in the plurality of primary functions;
determining that a rule is satisfied based on applying one or more conditions of the rule to the collection of event objects; and
identifying, based on the determination that the rule is satisfied, the software application as malicious software code.

21. The one or more non-transitory computer-readable storage media of claim 20, further comprising program code that, when executed by the one or more processors, cause the one or more processors to further perform the method by deriving a collection attribute based on values of attributes included in the event objects stored in the collection of event objects, wherein determining that the rule is satisfied comprises applying the one or more conditions to the collection attribute.

22. The one or more non-transitory computer-readable storage media of claim 21, wherein the collection attribute specifies a total number of the event objects stored in the collection of event objects.

\* \* \* \* \*